US012659248B2

(12) United States Patent
Yamashina et al.

(10) Patent No.: US 12,659,248 B2
(45) Date of Patent: Jun. 16, 2026

(54) DISTRIBUTED SYSTEM AND DISTRIBUTED DEVICE WHICH CONSTITUTES DISTRIBUTED SYSTEM

(71) Applicant: Hitachi High-Tech Corporation, Tokyo (JP)

(72) Inventors: Kazushi Yamashina, Tokyo (JP); Tetsuji Ohsawa, Tokyo (JP); Yuichiro Shiga, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 50 days.

(21) Appl. No.: 18/840,551

(22) PCT Filed: Dec. 29, 2022

(86) PCT No.: PCT/JP2022/048697
§ 371 (c)(1),
(2) Date: Aug. 22, 2024

(87) PCT Pub. No.: WO2023/171104
PCT Pub. Date: Sep. 14, 2023

(65) Prior Publication Data
US 2025/0168092 A1 May 22, 2025

(30) Foreign Application Priority Data

Mar. 10, 2022 (JP) ................................. 2022-036984

(51) Int. Cl.
*H04L 43/0823* (2022.01)
*H04L 1/00* (2006.01)

(52) U.S. Cl.
CPC ........ *H04L 43/0823* (2013.01); *H04L 1/0061* (2013.01)

(58) Field of Classification Search
CPC . H04L 43/0823; H04L 1/0061; H04L 43/045; H04L 43/0847; H04L 41/0631
See application file for complete search history.

(56) References Cited

U.S. PATENT DOCUMENTS

| | | | | | | |
|---|---|---|---|---|---|---|
| 5,315,502 | A | * | 5/1994 | Koyama | ............ | G05B 23/0229 706/912 |
| 11,073,525 | B2 | * | 7/2021 | Kaneko | ............ | G01N 35/00663 |

(Continued)

FOREIGN PATENT DOCUMENTS

| | | | | | |
|---|---|---|---|---|---|
| DE | 10 2017 222 880 | A1 | | 6/2019 | |
| EP | 0295380 | A2 | * | 12/1988 | ............ H04L 69/00 |

(Continued)

OTHER PUBLICATIONS

International Search Report (PCT/ISA/210) issued in PCT Application No. PCT/JP2022/048697 dated Mar. 20, 2023 with English translation (5 pages).

(Continued)

*Primary Examiner* — Philip C Lee
(74) *Attorney, Agent, or Firm* — Crowell & Moring LLP

(57) ABSTRACT

The present invention addresses the problem of inferring the cause of a fault in a distributed system configured from a plurality of distributed devices. A distributed system configured from a plurality of distributed devices capable of communicating over a communication channel, wherein each of the distributed devices has: a communication port for receiving a communication signal from another distributed device; a storage unit for storing device information which expresses properties of the distributed system; and an inspection unit for detecting a communication error via the communication signal, indicating said communication error, and inferring the cause of the communication error by comparing the device information with the communication error information, which includes the time when the com- (Continued)

munication error occurred, the communication error type and the place where the communication error was detected.

18 Claims, 10 Drawing Sheets

(56)                    References Cited

U.S. PATENT DOCUMENTS

| | | | |
|---|---|---|---|
| 2005/0144505 A1 | 6/2005 | Takeuchi et al. | |
| 2008/0256404 A1* | 10/2008 | Funatsu | G01R 31/318342 |
| | | | 714/724 |
| 2009/0238092 A1* | 9/2009 | Lee | H04W 24/00 |
| | | | 370/253 |
| 2010/0034100 A1* | 2/2010 | Beyers | H04L 43/50 |
| | | | 370/250 |
| 2015/0089332 A1* | 3/2015 | Chambers | H04L 1/08 |
| | | | 714/807 |
| 2015/0256324 A1* | 9/2015 | Kang | H04L 7/0016 |
| | | | 375/371 |
| 2017/0250883 A1 | 8/2017 | Sawada et al. | |
| 2018/0018216 A1* | 1/2018 | Halford | H04L 1/0061 |
| 2018/0048519 A1* | 2/2018 | Outhred | H04L 43/0823 |
| 2020/0201300 A1 | 6/2020 | Baba et al. | |
| 2023/0010150 A1* | 1/2023 | Ben-Ishay | G06F 3/0607 |

FOREIGN PATENT DOCUMENTS

| | | | | |
|---|---|---|---|---|
| EP | 3979079 A1 * | 4/2022 | | G06F 11/1048 |
| JP | 2009-202720 A | 9/2009 | | |
| JP | 2018-22939 A | 2/2018 | | |
| JP | 2019-101970 A | 6/2019 | | |
| JP | 2020-120324 A | 8/2020 | | |
| JP | 2021-120165 A | 8/2021 | | |
| WO | WO-2017076325 A1 * | 5/2017 | | H04N 21/4405 |

OTHER PUBLICATIONS

Japanese-language Written Opinion (PCT/ISA/237) issued in PCT Application No. PCT/JP2022/048697 dated Mar. 20, 2023 with English translation (6 pages).

Extended European Search Report issued in European Application No. 22931073.5 dated Feb. 11, 2026 (8 pages).

* cited by examiner

[FIG. 1]
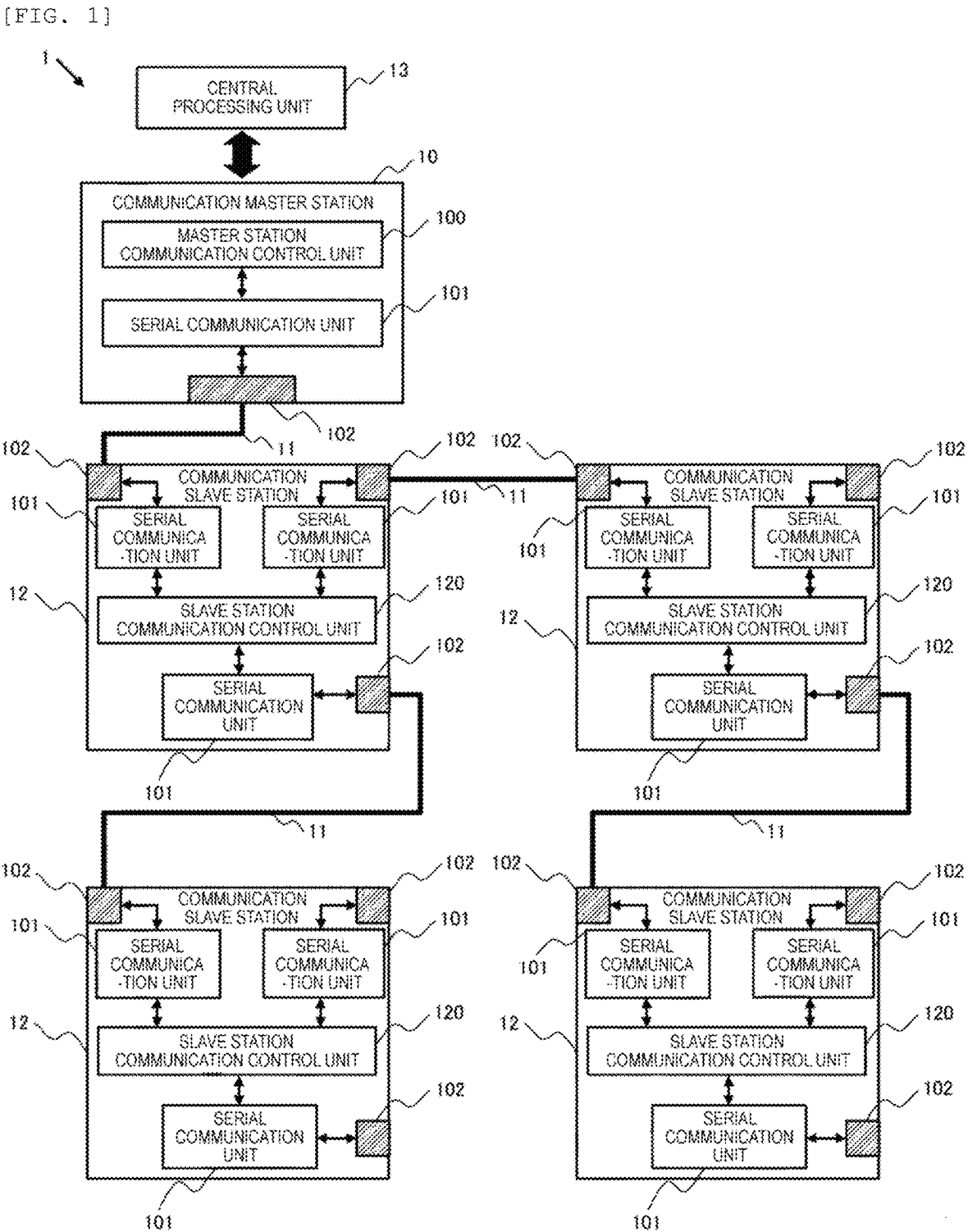

[FIG. 2]
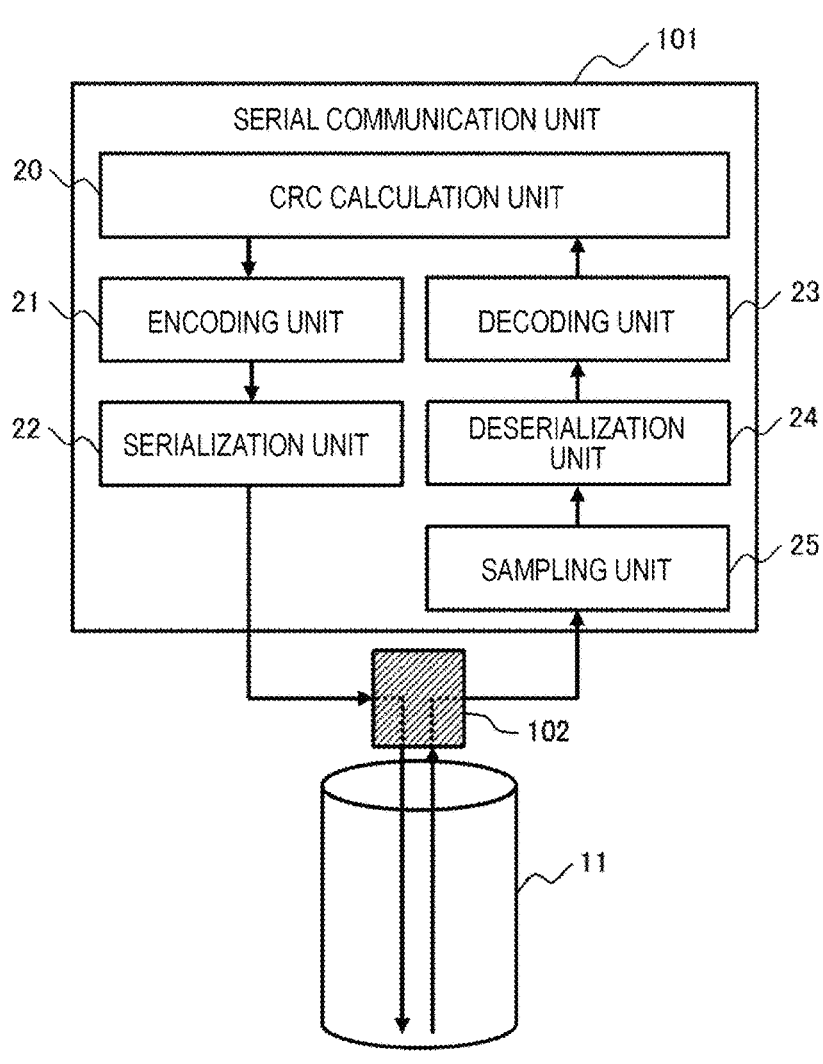
[FIG. 3]
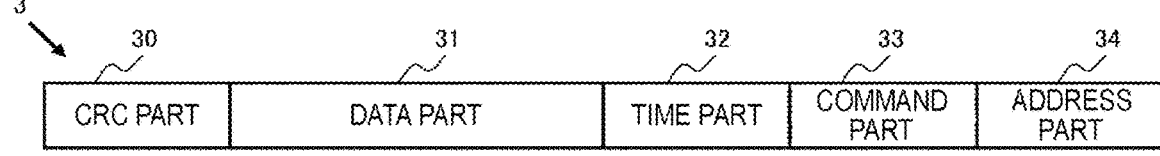

[FIG. 4]
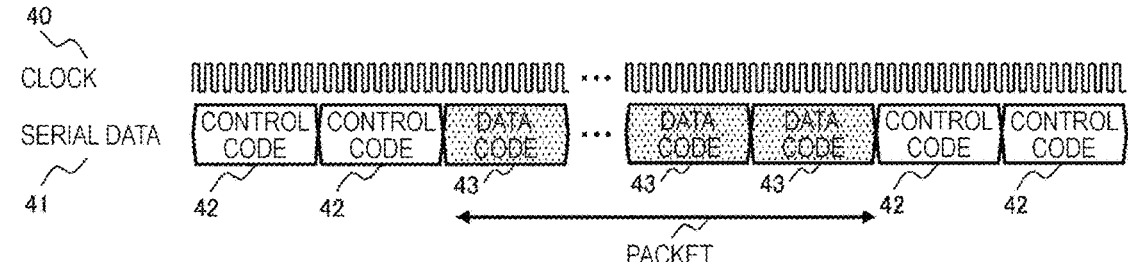
40
CLOCK
SERIAL DATA
41
| CONTROL CODE | CONTROL CODE | DATA CODE | ... | DATA CODE | DATA CODE | CONTROL CODE | CONTROL CODE |
42        42        43          43      43        42            42
PACKET
[FIG. 5]
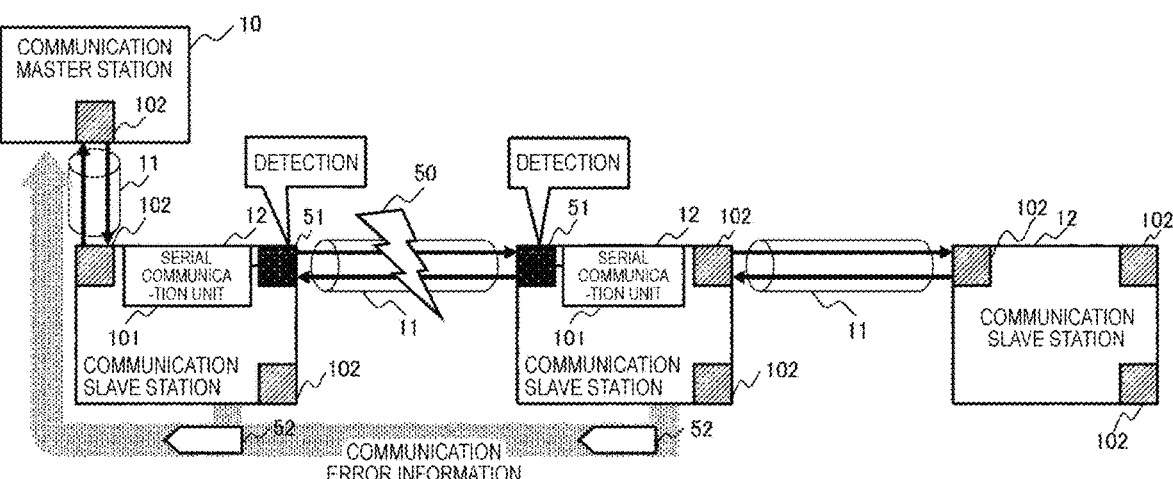

[FIG. 6]

| COMMUNICATION SIGNAL | | SYMPTOM OF SIGNAL ABNORMALITY | DETECTION MEANS |
|---|---|---|---|
| | | CONTROL CODE OR DATA CODE BECOMES UNDEFINED BINARY ARRAY | CODE ERROR CHECK |
| DATA GARBLING | | DATA CODE UNINTENTIONALLY BECOMES ANOTHER DATA CODE | CYCLIC REDUNDANCY CHECK |
| | | CONTROL CODE UNINTENTIONALLY BECOMES DATA CODE | PACKET TIME-OUT CHECK |
| | | CONTROL CODE UNINTENTIONALLY BECOMES ANOTHER CONTROL CODE | CONTROL CODE RECEPTION CHECK |
| INTERRUPTION | | TRANSMISSION SIGNAL DOES NOT CHANGE | DISCONNECTION CHECK |

[FIG. 7]
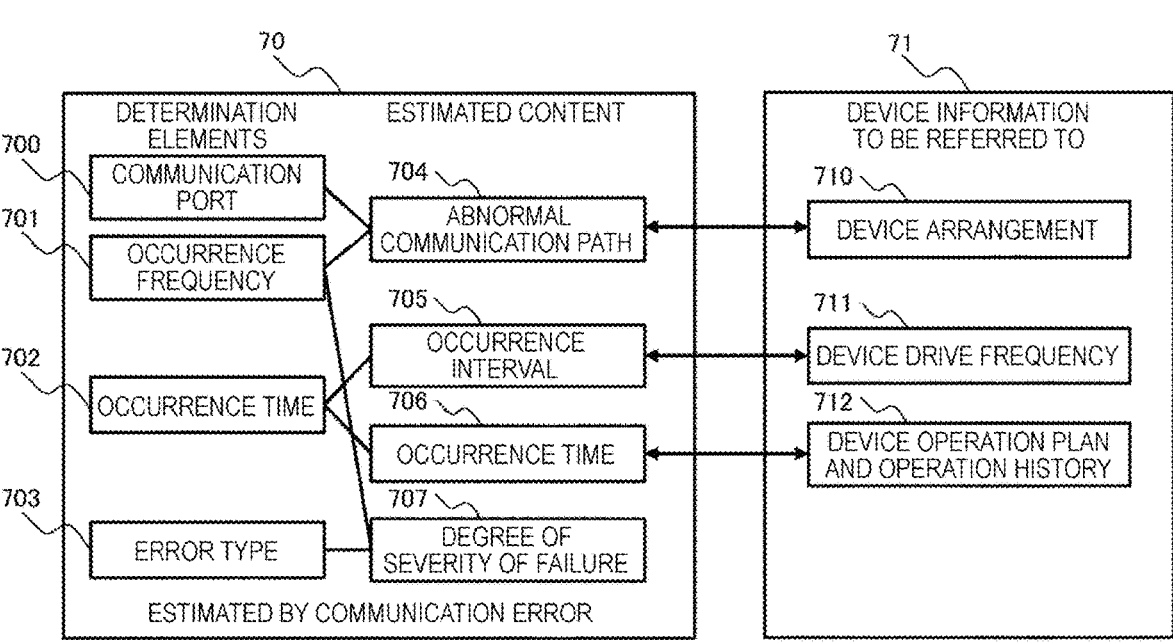

[FIG. 8]
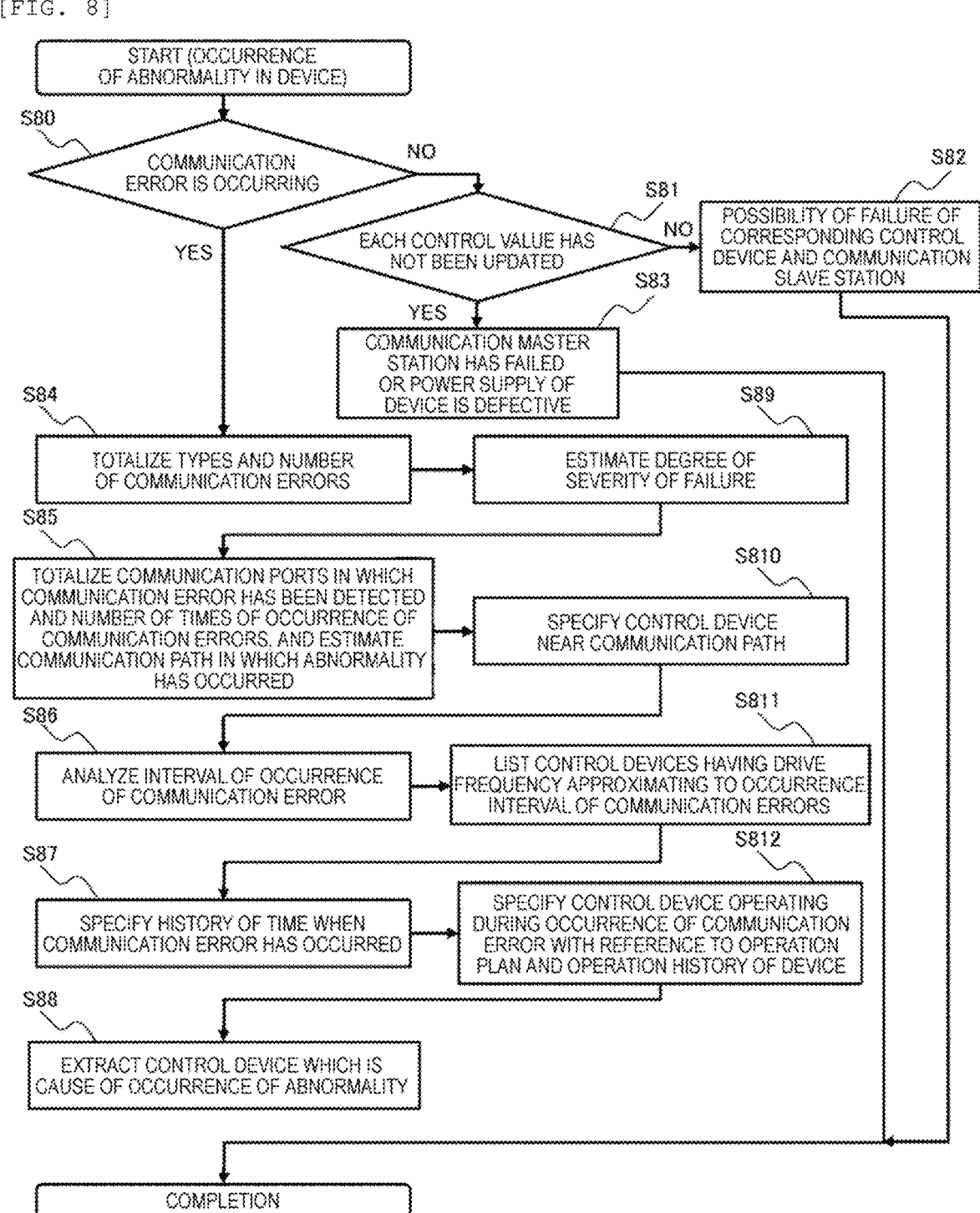

[FIG. 9]
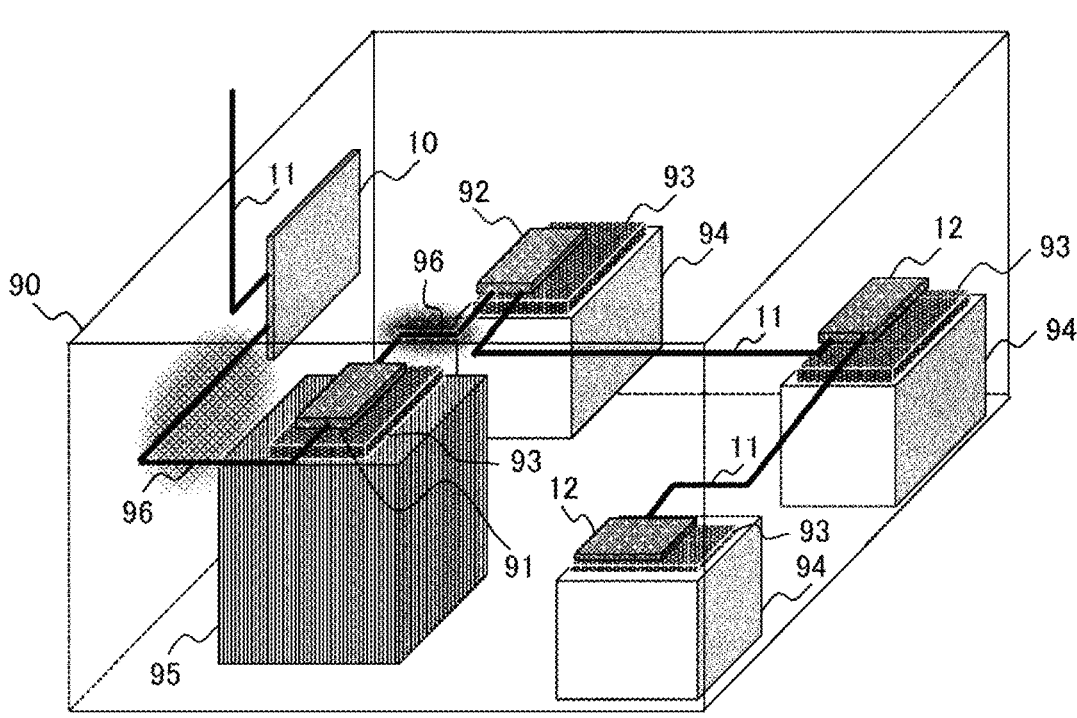

[FIG. 10]

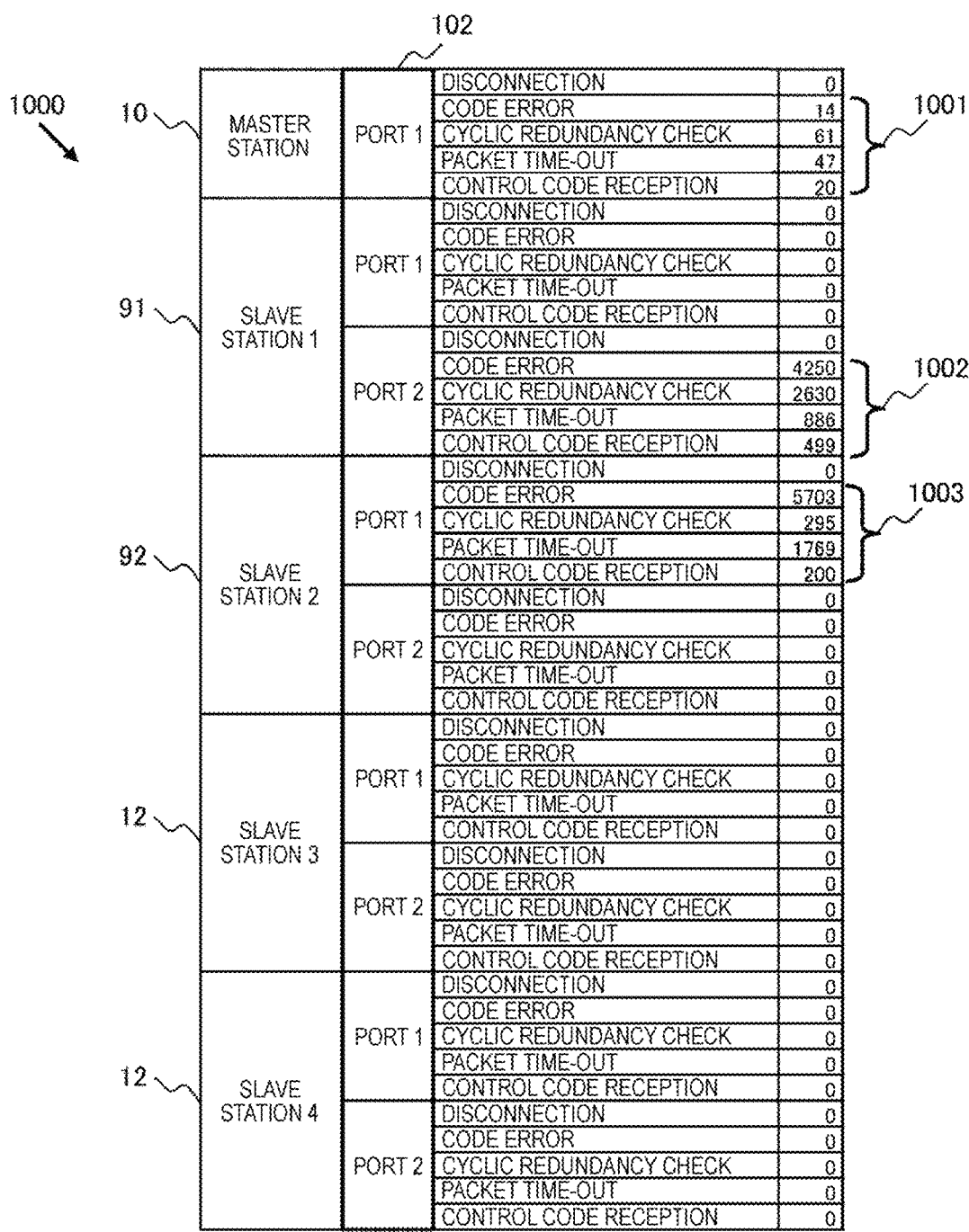

| | | | | |
|---|---|---|---|---|
| 1000 | | 102 | | |
| 10 | MASTER STATION | PORT 1 | DISCONNECTION | 0 |
| | | | CODE ERROR | 14 |
| | | | CYCLIC REDUNDANCY CHECK | 61 |
| | | | PACKET TIME-OUT | 47 |
| | | | CONTROL CODE RECEPTION | 20 |
| 91 | SLAVE STATION 1 | PORT 1 | DISCONNECTION | 0 |
| | | | CODE ERROR | 0 |
| | | | CYCLIC REDUNDANCY CHECK | 0 |
| | | | PACKET TIME-OUT | 0 |
| | | | CONTROL CODE RECEPTION | 0 |
| | | PORT 2 | DISCONNECTION | 0 |
| | | | CODE ERROR | 4250 |
| | | | CYCLIC REDUNDANCY CHECK | 2630 |
| | | | PACKET TIME-OUT | 886 |
| | | | CONTROL CODE RECEPTION | 499 |
| 92 | SLAVE STATION 2 | PORT 1 | DISCONNECTION | 0 |
| | | | CODE ERROR | 5703 |
| | | | CYCLIC REDUNDANCY CHECK | 295 |
| | | | PACKET TIME-OUT | 1769 |
| | | | CONTROL CODE RECEPTION | 200 |
| | | PORT 2 | DISCONNECTION | 0 |
| | | | CODE ERROR | 0 |
| | | | CYCLIC REDUNDANCY CHECK | 0 |
| | | | PACKET TIME-OUT | 0 |
| | | | CONTROL CODE RECEPTION | 0 |
| 12 | SLAVE STATION 3 | PORT 1 | DISCONNECTION | 0 |
| | | | CODE ERROR | 0 |
| | | | CYCLIC REDUNDANCY CHECK | 0 |
| | | | PACKET TIME-OUT | 0 |
| | | | CONTROL CODE RECEPTION | 0 |
| | | PORT 2 | DISCONNECTION | 0 |
| | | | CODE ERROR | 0 |
| | | | CYCLIC REDUNDANCY CHECK | 0 |
| | | | PACKET TIME-OUT | 0 |
| | | | CONTROL CODE RECEPTION | 0 |
| 12 | SLAVE STATION 4 | PORT 1 | DISCONNECTION | 0 |
| | | | CODE ERROR | 0 |
| | | | CYCLIC REDUNDANCY CHECK | 0 |
| | | | PACKET TIME-OUT | 0 |
| | | | CONTROL CODE RECEPTION | 0 |
| | | PORT 2 | DISCONNECTION | 0 |
| | | | CODE ERROR | 0 |
| | | | CYCLIC REDUNDANCY CHECK | 0 |
| | | | PACKET TIME-OUT | 0 |
| | | | CONTROL CODE RECEPTION | 0 |

1001 (MASTER STATION PORT 1)
1002 (SLAVE STATION 1 PORT 2)
1003 (SLAVE STATION 2 PORT 1)

[FIG. 11]
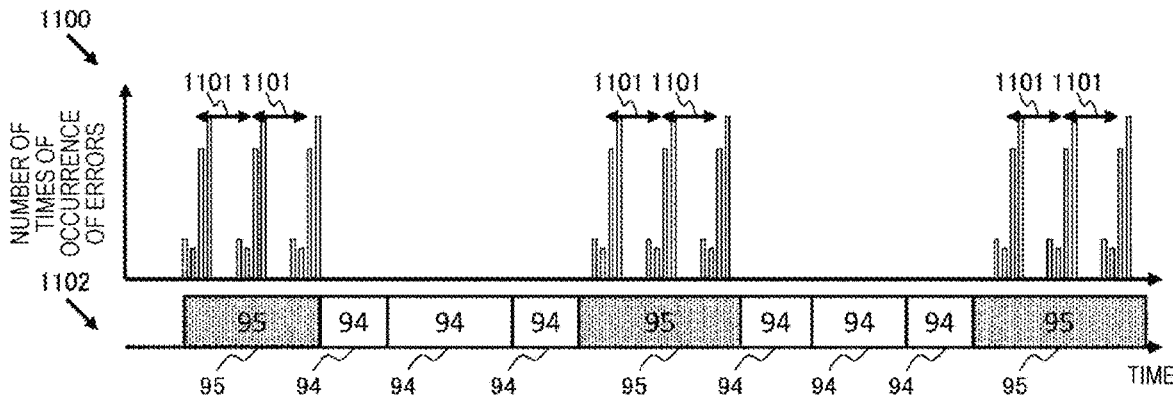
[FIG. 12]
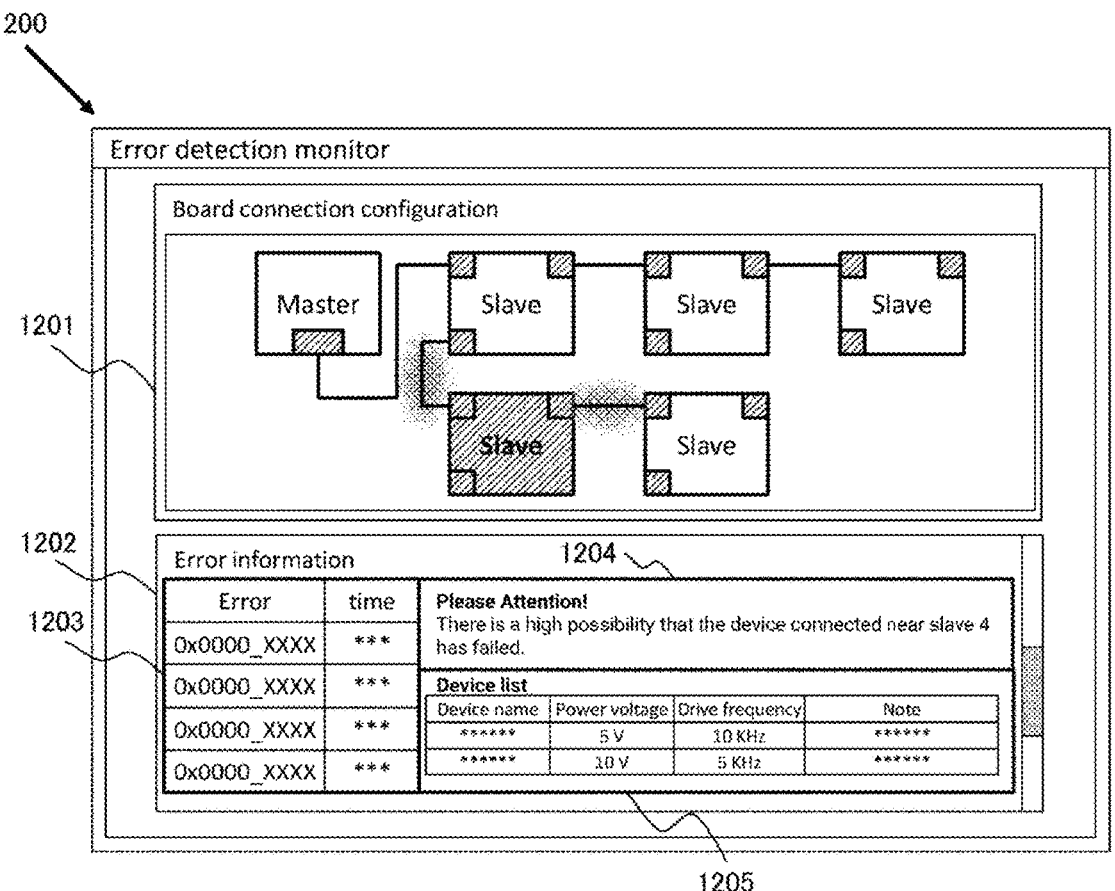

[FIG. 13]
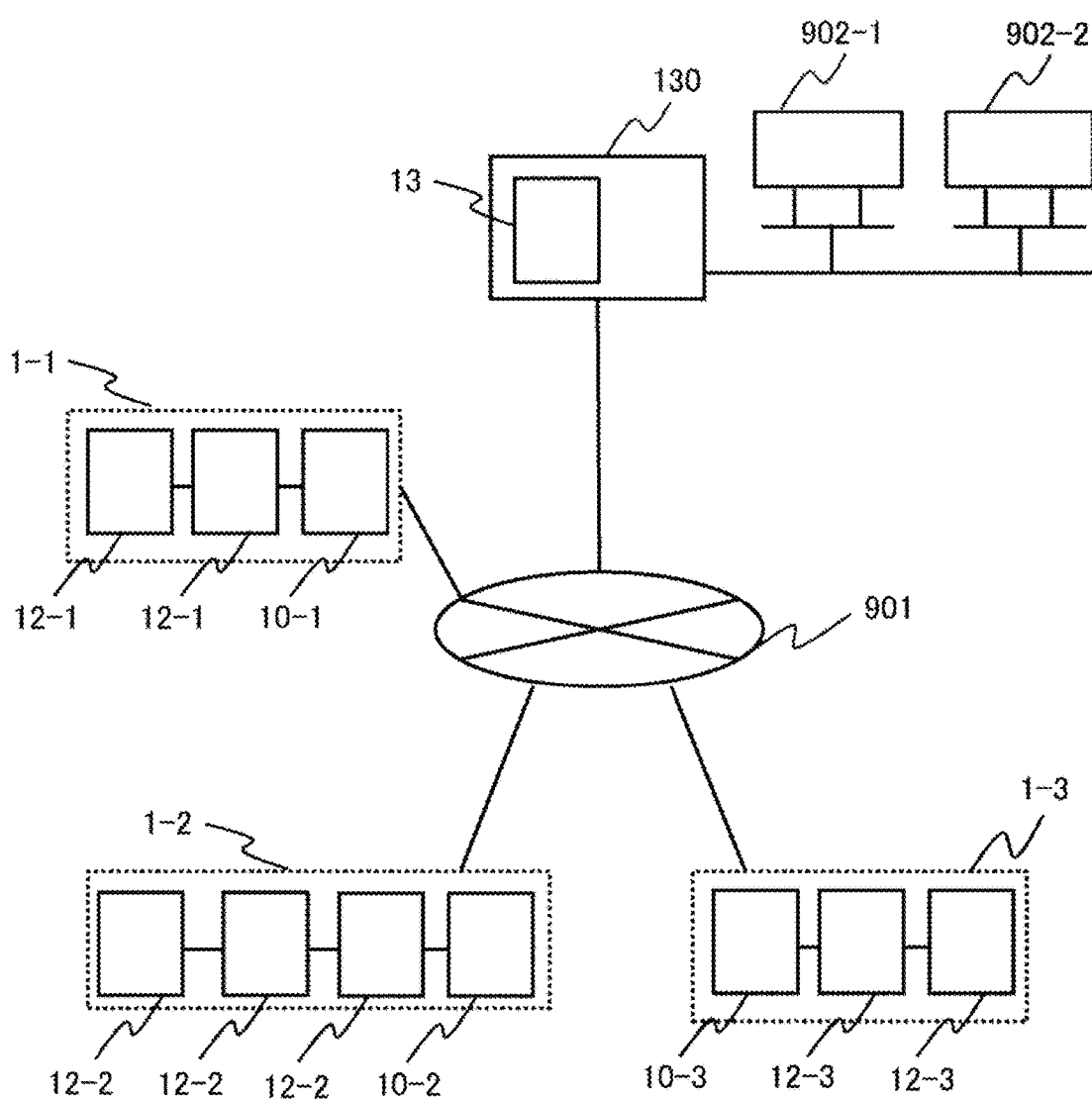

DISTRIBUTED SYSTEM AND DISTRIBUTED DEVICE WHICH CONSTITUTES DISTRIBUTED SYSTEM

TECHNICAL FIELD

The present invention relates to a distributed system in which the entire system is constituted by a plurality of units (distributed devices), and communication technology in the distributed system. Distributed systems include a communication system that is constituted by a plurality of communication devices and a distributed control system that controls a control target such as the entire system. Furthermore, the distributed control system can be applied to industrial equipment such as semiconductor inspection equipment and medical inspection analysis equipment.

BACKGROUND ART

Industrial equipment such as semiconductor inspection equipment and medical inspection analysis equipment generally uses an electronic control system that provides analog input/output paths to a sensor and an actuator installed in the equipment from a plurality of centrally managed control boards. At this time, it is necessary to respond to diversification of needs for equipment in recent years, but with the current system, an increase in the amount of wiring, the redesign of a board, and the like occur in response to functional expansion, it is urgent to improve the design productivity of electronic systems.

Consequently, as disclosed in PTL 1, a network-type distributed control system is applied to an electronic system within equipment, and thus it can be expected to improve functional expandability while reducing an analog wiring. On the other hand, as a system configuration within equipment has become more complex in recent years, the probability that installed devices will cause electrical abnormalities has increased. However, there is currently a lack of means capable of estimating a part causing a defect or the cause of the defect.

Further, PTL 2 discloses a control system including a plurality of control targets that are provided in a robot and a distributed control system that performs distributed control of the plurality of control targets, in which the control system includes an abnormality management unit that manages whether an abnormality has occurred in a plurality of functional units constituting the control system, and a display control unit that displays each of the plurality of functional units on a display unit, and the display control unit displays the functional unit in which an abnormality has not occurred on the display unit in a first mode, among the plurality of functional units, and displays the functional unit in which an abnormality has occurred on the display unit in a second mode different from the first mode.

CITATION LIST

Patent Literature

PTL 1: JP2018-22939A
PTL 2: JP2021-120165A

SUMMARY OF INVENTION

Technical Problem

However, with the technique disclosed in PTL 1, as described above, it is difficult to estimate a part causing a defect or the cause of the defect. Further, in the technique disclosed in PTL 2, it is necessary to prepare in advance a causal relationship between an abnormal event and the cause thereof within the control system. That is, when an unexpected abnormality occurs, the cause of occurrence of the abnormality cannot be specified, and it takes time to return from an abnormal state to a normal state. Consequently, an object of the invention is to estimate the cause of occurrence of a defect in a distributed system constituted by a plurality of distributed devices.

Solution to Problem

In view of the above, the invention is targeted at a distributed system that is constituted by a plurality of distributed devices and in which a communication path is provided between the distributed devices. In each of the distributed devices, a communication error in the communication is detected, and communication error information indicating the content of the detected communication error is compared with device information indicating the characteristics of the distributed system or the distributed devices constituting the distributed system to estimate the cause of occurrence of the communication error.

More specifically, in a distributed system including a plurality of distributed devices that capable of are communication via a communication path, each of the distributed devices includes a communication port that receives communication signals from the other distributed devices, a storage unit that stores device information indicating characteristics of the distributed system, and an inspection unit that detects a communication error in accordance with the communication signal, and estimates a cause of occurrence of the communication error by comparing the device information with communication error information indicating the communication error and including the time of occurrence of the communication error, a type of the communication error, and a location where the communication error is detected.

The invention also includes distributed devices that constitute a distributed system. Furthermore, an embodiment of the invention also includes a method of estimating the cause of occurrence of an abnormality using a distributed system.

Advantageous Effects of Invention

According to the invention, it is possible to estimate the cause of occurrence of a defect in a distributed system.

BRIEF DESCRIPTION OF DRAWINGS

FIG. 1 is a diagram showing a configuration example of a distributed control system in an embodiment of the invention.

FIG. 2 is a diagram showing details of a serial communication unit in Example 1.

FIG. 3 is a diagram showing a packet used in a distributed control system 1 in Example 1.

FIG. 4 is a diagram showing an example of a data configuration of a communication signal (packet) used in the distributed control system 1 in Example 1.

FIG. 5 is a diagram showing a state where a communication error is detected in Example 1.

FIG. 6 is a diagram showing a correspondence relationship between an abnormal pattern occurring in a communication signal and a detection means therefor in Example 1.

FIG. 7 is a diagram showing a correspondence relationship between an estimated content estimated from communication error information and device information to be referred to in Example 1.

FIG. 8 is a flowchart showing a procedure of estimating the cause of occurrence of an abnormality in Example 1.

FIG. 9 is a diagram showing an example of industrial equipment in which a distributed control system in Example 2 is installed.

FIG. 10 is a diagram showing an example of totalization results of communication error information for each communication port in Example 2.

FIG. 11 is a diagram showing a graph visualizing a communication error occurrence interval and a graph of an operation history of each control device in Example 2.

FIG. 12 is a diagram showing a communication error monitoring screen that displays an estimated cause of occurrence of an abnormality in a distributed control system in Example 3.

FIG. 13 is a diagram showing an application example of each example.

DESCRIPTION OF EMBODIMENTS

An embodiment of the invention will be described below. In this embodiment, a distributed control system for controlling control targets including itself is used as an example of a distributed system. FIG. 1 is a diagram showing a configuration example of a distributed control system 1 in this embodiment. In FIG. 1, the distributed control system 1 includes a communication master station 10, a communication path 11, and a communication slave station 12. Here, the communication master station 10 and the communication slave station 12 correspond to distributed devices of the invention. Each of the communication master station 10 and the communication slave station 12 includes a serial communication unit 101 and a communication port 102. Among these, the communication port 102 communicates with other devices (the communication master station 10 and the communication slave station 12). That is, each of the communication master station 10 and the communication slave station 12 transmits and receives communication signals to and from each other. The serial communication unit 101 also includes a CRC calculation unit 20 that detects a communication error as a defect in the distributed control system 1 and estimates the cause of occurrence of the communication error.

Specific processing of each of these components will be described in each example. Further, the CRC calculation unit 20 is a type of inspection unit that detects a defect such as a communication error in the distributed control system 1 and estimates the cause of occurrence thereof.

Furthermore, each of the communication master station 10 and the communication slave station 12 includes a storage unit that stores device information indicating characteristics of the distributed control system 1. Here, the device information may be information indicating the characteristics of industrial equipment in which the communication master station 10, the communication slave station 12, and the distributed control system 1 are provided.

Furthermore, in this embodiment, it is desirable that a central processing unit 13 be connected to execute operations and settings for comprehensively managing the entire distributed control system 1.

Defects in this embodiment include various defects such as communication errors, failures, breakdowns, deterioration, and abnormalities. Furthermore, the defects include defects in the distributed control system 1, the communication master station 10, the communication slave station 12, and the industrial equipment. This completes the description of this embodiment, and examples showing more specific contents will be described below.

Example 1

Hereinafter, Example 1 will be described with reference to FIG. 1. In FIG. 1, devices constituting the distributed control system 1 are as described above. The communication master station 10 also includes a master station communication control unit 100 that manages overall communications in the distributed control system 1, a serial communication unit 101 that transmits data by receiving or transmitting communication signals, and a communication port 102 that serves as a physical layer of a communication function. Further, the master station communication control unit 100 is connected to the serial communication unit 101, and the serial communication unit 101 is connected to the communication port 102. Furthermore, the communication master station 10 may be connected to the central processing unit 13 in order to operate and set the distributed control system 1.

Further, the communication slave station 12 includes a slave station communication control unit 120 that manages responses to the communication master station 10 or relaying of communications to other communication slave stations 12, and a serial communication unit 101 and a communication port 102 similar to the communication master station 10.

Here, the communication master station 10 is connected to the communication slave station 12 via the communication port 102 and the communication path 11. Further, the communication slave station 12 is connected to other communication slave stations 12 or the communication master station 10 via the communication port 102 and the communication path 11. Further, the communication master station 10 and the communication slave station 12 transmit any data to each other through serial communication.

Furthermore, the distributed control system 1 can be installed in industrial equipment that executes various operations such as production and transportation. When a breakdown or noise occurs in the industrial equipment, it is expected that an abnormality will also occur in a communication signal transmitted through the communication path 11. Regarding the invention, the distributed control system 1 detects an abnormality occurring in a communication signal on the communication path 11 as a communication error in the communication master station 10 or the communication slave station 12. Further, the distributed control system 1 estimates the cause of occurrence of the communication error based on the information on the communication error. The operation of serial communication and communication error detection will be described below. Details of an example of installation in industrial equipment will be described in Example 2.

FIG. 2 is a diagram showing details of the serial communication unit 101 in this embodiment. The serial communication unit 101 includes the CRC calculation unit 20, which is a type of inspection unit, an encoding unit 21, a serialization unit 22, a decoding unit 23, a deserialization unit 24, and a sampling unit 25. Detailed operations thereof will be described later.

FIG. 3 is a diagram showing a packet 3 used in the distributed control system 1 in this embodiment. The packet 3 is a type of communication signal communicated in the distributed control system 1, and may include code data such as a data code and a control code. The packet 3 in this embodiment includes a CRC part 30, a data part 31, a time part 32, a command part 33, and an address part 34.

The CRC part 30 is a value for checking whether there is an error in a binary array prepared in the packet 3, is generally referred to as a cyclic redundancy check, and is calculated based on the binary array constituting the packet 3 in accordance with any polynomial. The data part 31 stores any data that the communication master station 10 or the communication slave station 12 desires to transmit through communication. The time part 32 stores the time when the packet 3 is issued. The command part 33 stores attributes of values in the data part 31, such as system settings and error information. The address part 34 stores a destination to which the packet 3 is to be transmitted.

Next, a communication error that occurs during communication in the distributed control system 1 will be described using noise occurring in a communication signal as an example. FIG. 4 is a diagram showing an example of a data configuration of a communication signal (packet) in this embodiment. In serial communication targeted in this example, when a binary array representing any data is transmitted as a communication signal, the reliability of the communication signal and additional information may be added by converting the binary array into a different binary array. For example, in 8B10B encoding technology, an 8-bit binary array is converted into a 10-bit binary array. Thereby, the quality of a communication signal is improved by dispersing the arrangement of 1 and 0 in the communication signal and reducing DC components included in the signal as far as possible. In such encoding technology, the converted binary array is predefined, and the converted binary array is often classified into data codes representing ordinary numerical values and control codes of a special binary array that can be used for controlling communication.

Such encoding technology is applied to the serial communication of the distributed control system 1 in this embodiment. As shown in FIG. 4 again, regarding a communication signal of the distributed control system 1, defined binary arrays are transmitted with a constant width like serial data 41 in synchronization with a clock 40. At this time, a control code 42 is a special binary array used for controlling communication, and a data code 43 is a binary array representing a normal numerical value, both of which are defined in advance. For this reason, when the packet 3 is transferred, the packet is constituted by at least one data code.

Here, a basic operation of the serial communication unit 101 will be described using FIG. 2 again. First, an operation of a transmission side of the serial communication unit 101 will be described. The master station communication control unit 100 or the slave station communication control unit 120 inputs the packet 3 to be transmitted to the CRC calculation unit 20. The CRC calculation unit 20 calculates a CRC value (cyclic redundancy check value) for the packet 3 and stores the CRC value in the CRC part 30 of the packet 3. The encoding unit 21 converts the packet 3 into a defined data code 43. At this time, the CRC calculation unit 20 divides the packet 3 into data units that can be converted by the encoding unit 21, and sequentially inputs the separate packets to the encoding unit 21. The data code 43 converted by the encoding unit 21 is input to the serialization unit 22 and transmitted bit by bit.

Further, this communication signal is transmitted to the communication master station 10 or the communication slave station 12 via the communication port 102 and the communication path 11. At this time, when there is no data code 43 to be transmitted, the serialization unit 22 transmits the control code 42 instead. Furthermore, regarding the control code 42, it is assumed that at least one type of control codes defined in advance are sequentially transferred. Thus, the control code 42 or the data code 43 is continuously transmitted in all of the communication paths 11 included in the distributed control system 1. Here, the continuous transmission includes transmission of communication signals at a predetermined cycle, sporadic transmission of transmission signals, transmission of communication signals without a break, and transmission of transmission signals including a dummy signal. The sporadic transmission also includes temporary suspension of transmission.

Next, an operation of a reception side of the serial communication unit 101 will be described. A communication signal received by the communication port 102 is first input to the sampling unit 25 via the communication path 11. The sampling unit 25 samples the input communication signal for each 1-bit data at an appropriate timing. Further, the sampled communication signal is restored as the data code 43 by the deserialization unit 24 and transferred to the decoding unit 23. Furthermore, even when the deserialization unit 24 receives the control code 42, the deserialization unit 24 transfers the control code to the decoding unit 23. At this time, the deserialization unit 24 continuously performs a disconnection check in which it is determined that communication has been interrupted when the value of the received communication signal is 1 or 0 and does not change for a certain period of time.

When the decoding unit 23 receives the data code 43, the decoding unit 23 decodes the received data code into normal data and transfers the data to the CRC calculation unit 20. This transfer may be executed only when the data code 43 is received. At this time, the decoding unit 23 continuously performs code error check for checking whether the received control code 42 or data code 43 is a defined correct binary array. Furthermore, when the decoding unit 23 continuously receives the control codes 42, the decoding unit 23 performs control code reception check for checking whether the order of the control codes 42 defined in advance has come.

Furthermore, the CRC calculation unit 20 sequentially converts data transferred from the decoding unit 23 as a packet 3, and calculates a CRC value of the packet 3 again. At this time, a cyclic redundancy check for checking whether the CRC value stored in the packet 3 and a newly calculated CRC value match each other is performed. Furthermore, the CRC calculation unit 20 receives the first data code 43 and performs a packet time-out check for checking whether the reception of the packet 3 has been completed within a certain period of time.

As described above, in a reception-side operation of the serial communication unit 101, the code error check, the control code reception check, the cyclic redundancy check, the packet time-out check, and the disconnection check are operated continuously, and when an abnormality occurs in each of the checks, a communication control unit is notified of these results as communication errors.

Here, a communication operation when noise 50 occurs in the distributed control system 1 will be described using FIG. 5. FIG. 5 is a diagram showing a state where a communication error is detected in this embodiment. FIG. 5 shows a case where an abnormality due to the noise 50 occurs in the communication path 11 connecting two communication slave stations 12. In this case, a communication error is detected in the serial communication unit 101 connected to two communication ports 51. When the serial communication unit 101 detects the communication error, the communication slave station 12 notifies the slave station communication control unit 120 of the detection of the communication error. The slave station communication control unit 120 stores, in the packet 3, the time when the notification of the communication error is received, the type of communication error, and information on the communication port 51 in which the communication error has been detected. The packet 3 at this time is transmitted to the communication master station 10 by the communication port 102 through serial communication as communication error information 52.

The same operation is performed also when noise occurs in the communication path 11 between the communication master station 10 and the communication slave station 12, but information on a communication error detected by the communication master station 10 may be stored in a log in the communication master station 10 or directly transferred to the central processing unit 13. In any case, in all of the communication master stations 10 and the communication slave stations 12, the time of occurrence, an error type, and a detected communication port 102 are recorded for each detected communication error information.

Basic functions of the distributed control system 1 which include a serial communication operation have been described so far. Next, a method of estimating the cause of an abnormality in the distributed control system 1 will be described. FIG. 6 is a diagram showing a correspondence relationship between patterns of abnormalities that occur in communication signals transmitted through the communication path 11 and their detection means. In FIG. 6, a case where data of a communication signal is garbled as an abnormality will be described. When noise is mixed into the communication signal, an error may occur in a binary array of the control code 42 or the data code 43 being transmitted, resulting in garbled data. Furthermore, there are four conceivable patterns of generation of garbled data.

When the control code 42 or the data code 43 is an undefined binary array, this can be detected by a code error check as described above.

When the data code 43 unintentionally becomes another data code 43 while receiving the data code 43, the data code 43 is transmitted only when the packet 3 is substantially transferred, and thus this can be detected by a cyclic redundancy check.

Here, the data code 43 is transmitted only when the packet 3 is transferred, and the data code 43 is supposed to be received continuously, and thus the reception of the data code 43 constituting the packet 3 is completed within a certain period of time. For this reason, when the control code 42 unintentionally becomes another data code 43, this can be detected by a packet time-out check.

When the control code 42 unintentionally becomes another control code 42, this can be detected by a control code reception check as described above.

Next, a case where a communication signal is interrupted due to a breakdown in the distributed control system 1 will be described.

When a communication signal is interrupted, the voltage of the communication signal does not often change for a certain period of time. That is, 1 and 0 of the communication signal received by the serial communication unit 101 no longer change, and this can be detected by a disconnection check. Thus, it is possible to detect each of abnormal patterns of communication signals that may occur in the communication path 11. Furthermore, the distributed control system 1 estimates a part where a communication error factor (abnormality factor) is highly likely to occur based on communication error information and various information on industrial equipment in which the distributed control system 1 is installed.

Here, FIG. 7 is a diagram showing a correspondence relationship between an estimated content 70 estimated from a communication error and device information 71 to be referred to in this example. First, the communication error information includes the type of communication error, the time when the communication error occurs, and information on the communication port 102 in which the communication error has been detected. Further, it is possible to acquire the number of times various communication errors occur by aggregating information on communication errors issued by the communication master station 10 or the communication slave station 12. As described above, the device information 71 is information: indicating the characteristics of the distributed control system 1, which is an example of a distributed system. An example of the device information 71 includes operation information of the distributed control system 1, such as control procedures for industrial equipment and positions and functions of devices within the industrial equipment. It is desirable that the device information 71 be stored in a storage unit (not shown) of a serial communication unit of each communication slave station or communication master station 10.

Thereby, there are four types of communication error determination factors, that is, communication port information 700, occurrence frequency information 701 (communication frequency), occurrence time information 702, and error type information 703. Furthermore, the estimated content 70 estimated from the communication error is determined by combining these determination factors.

First, the CRC calculation unit 20 can estimate an abnormal communication path 704 by combining the communication port information 700 and the occurrence frequency information 701. When an abnormality occurs in the communication path 11 as shown in FIG. 5 in each communication port 102 provided in the distributed control system 1, a communication error is detected in at least any communication port 102 connected to the communication path 11 in which an abnormality occurs. For this reason, in the distributed control system 1, the communication path 11 connected to two sets of communication ports 102 in which the communication errors are detected the most for a certain period of time can be estimated as an abnormal communication path 704.

At this time, it is highly likely that a communication error is caused by equipment installed in the vicinity of the abnormal communication path 704. Thus, the CRC calculation unit 20 can list equipment installed in the vicinity of the communication path 704 where an abnormality has occurred with reference to device arrangement 710 of the information industrial equipment included in the device information 71.

Next, the CRC calculation unit 20 can acquire occurrence interval information 705 on intervals at which a communication error occurs by using a plurality of pieces of occurrence time information 702. This information is particularly useful for periodically occurring abnormalities. At this time, the cause of the communication error is highly likely to be equipment having a drive frequency similar to that of the occurrence interval information 705. Thus, the CRC calculation unit 20 can list equipment that is highly likely to be the cause of an abnormality with reference to drive frequency information 711 of the devices of the industrial equipment included in the device information 71.

Furthermore, in the occurrence time information 702 of the communication error, there is a high possibility that equipment in the industrial equipment operating at the same time will be the cause of an abnormality. Thus, it is possible to list equipment operating when a communication error occurs with reference to a device operation plan and operation history information 712.

Here, in the distributed control system 1, it is difficult to predict how a noise voltage or a noise current will affect a communication signal being transmitted on the communication path 11. In the distributed control system 1, the CRC calculation unit 20 can detect garbled data generated when affected by noise during a certain predetermined period (relatively short time) by the above-described code error check, cyclic redundancy check, packet time-out check, and control code reception check.

On the other hand, in the disconnection check, the condition for detecting disconnection is that there is no displacement of a communication signal for a certain period of time. At this time, in addition to a case where the communication signal is permanently interrupted, it can also be determined that the communication signal has been affected by noise for a relatively long period of time. Thus, by combining the communication error type information 703 and the occurrence frequency information 701, the CRC calculation unit 20 determines that a failure in the distributed control system 1 is serious when the following condition is satisfied. Here, the condition indicates that the more frequently communication errors occur, the more disconnections are detected in the communication errors.

Here, a procedure of estimating the cause of occurrence of an abnormality based on the communication error information and the device information 71 will be described with reference to FIG. 8. FIG. 8 is a flowchart showing the procedure of estimating the cause of occurrence of an abnormality in this embodiment. From here on, for convenience of description, it is assumed that the communication slave station 12 is connected to a control device necessary for the operation of industrial equipment.

When a defect occurs in device control, that is, in the distributed control system 1, first in step S80, the CRC calculation unit 20 checks whether a communication error has occurred. As a result, when no communication error has occurred (NO), the processing proceeds to step S81. Furthermore, when a communication error has occurred (YES), the processing proceeds to step S84.

Furthermore, in step S81, the CRC calculation unit 20 checks whether a control value has been updated. As a result, when each control value (for example, the control value) has not been updated, communication in the distributed control system 1 has not been established, and input/output to/from the control device via communication cannot be performed. In this case, it is determined that the control value has not been updated (YES), and the processing proceeds to step S83. Then, in step S83, the CRC calculation unit 20 determines that the system has not been established due to a breakdown of the communication master station 10 or a defect of the device power supply.

On the other hand, when some control values have been successfully updated in step S81 (NO), the processing proceeds to step S82. At this time, regarding the control value that corresponds to the occurrence of an abnormality, there may be patterns such as the control value not being updated, the control value deviating, or the frequency of updating the control value being abnormal. For this reason, in step S82, the CRC calculation unit 20 determines that the first possibility is a breakdown of the communication slave station 12 or the control device connected to the communication slave station 12, which corresponds to the input/output of the control value.

Furthermore, in step S84, the CRC calculation unit 20 totalizes the number of times each type of communication error occurs. Then, in step S89, the CRC calculation unit 20 determines the degree of severity of a failure within the device at the current stage, in accordance with the totalized number of times of occurrence. It is desirable that a specific degree of severity be defined for each industrial equipment into which the distributed control system 1 is introduced.

Furthermore, in step S85, the CRC calculation unit 20 totalizes the number of times of occurrence of communication errors and information on communication ports in which the communication errors are detected, and estimates a communication path 11 in which an abnormality has occurred. Further, in step S810, the CRC calculation unit 20 specifies a control device in the vicinity of the communication path 11 estimated in step S85 as a candidate for a control device in which an abnormality has occurred. Here, the term "vicinity" includes a control device connected to the estimated communication path 11 and a control device at a predetermined position, such as a control device disposed closest.

Next, in step S86, the CRC calculation unit 20 analyzes a communication error occurrence interval, that is, an occurrence interval. Further, in step S811, the CRC calculation unit 20 specifies a control device having a drive frequency that approximates to the analyzed communication error occurrence interval as a candidate for a control device in which an abnormality has occurred. Here, the approximation indicates a predetermined relationship such as a difference being equal to or less than a threshold value.

Next, in step S87, the CRC calculation unit 20 specifies a history of times at which communication errors have occurred. Then, in S812, the CRC calculation unit 20 compares the history with an operation history or operation plan of the distributed control system 1 or the industrial equipment in which the distributed control system 1 is installed. By using this result, the CRC calculation unit 20 specifies a control device that is operating at the time when a communication error occurs as a candidate for a control device in which an abnormality occurs.

Then, in step S88, the CRC calculation unit 20 estimates a control device considered to be the cause of the abnormality and the degree of severity of a failure that occurs. Then, up to step S812, the CRC calculation unit 20 extracts the control device that is the cause of the abnormality from the candidates specified in steps S810, S811, and S812. To this end, for example, the CRC calculation unit 20 sequentially extracts control devices with many conditions used for specification in each step control devices that are the cause of the abnormality. Here, the extracted control devices may be a predetermined number of higher-level control devices, or may be devices with conditions of which the number is a predetermined number or more. This completes the description of Example 1.

Example 2

Next, Example 2 will be described. This example is an example in which the distributed control system 1 is installed in industrial equipment. FIG. 9 is a diagram showing a configuration example when the distributed control system 1 according to this example is installed in the industrial equipment. In FIG. 9, industrial equipment 90 includes a communication master station 10, a communication path 11, a communication slave station 12, an input/output substrate 93, and a control device 94. The input/output substrate 93 inputs and outputs control commands or feedback values to and from the control device 94 via communication, and the control device 94 is a control target such as an actuator or sensor that constitutes the industrial equipment.

A communication slave station 91 and a communication slave station 92 have the same function as that of the communication slave station 12, and a control device 95 has the same function as that of the control device 94. Further, a communication path 96 has the same function as that of the communication path 11.

In this example, regarding the estimation of the cause of an abnormality of the distributed control system 1, an example of estimation in a case where the control device 95 is the cause of the abnormality will be described. Here, it is assumed that a communication error occurs and an estimation procedure shown in FIG. 8 is started.

Also in this example, as described in Example 1 with reference to FIG. 8, the type of communication error is detected as a communication error. Here, FIG. 10 is a diagram showing an example of a totalization result of communication error information for each communication port in this example. Here, as the totalization result of the communication error information, a totalization result of the number of times of occurrence of communication errors is used. A totalization result 1000 in FIG. 10 shows a communication port 102 provided for each communication master station 10 or communication slave station 12, and also shows the number of times of occurrence of communication errors which is detected for each communication port 102. This totalization result 1000 will be totalized by the CRC calculation unit 20.

Here, it can be understood that a communication error has occurred by using the totalization result 1000.

In other words, the number of communication errors 1001 corresponding to the communication port 102 of the communication master station 10 in the totalization result 1000, the number of communication errors 1002 corresponding to the communication port 102 of the communication slave station 91, and the number of communication errors 103 corresponding to a port 1 of the communication slave station 92 are used. At this time, the number of communication errors 1002 and the number of communication errors 1003 are outstanding, indicating that the number of occurrences of communication errors is large. Further, since no communication error of disconnection has occurred, the CRC calculation unit 20 can estimate that an abnormality due to noise has occurred in the communication path 96 connecting the communication slave station 91 and the communication slave station 92.

Further, FIG. 11 is a diagram showing a graph 1100 visualizing a communication error occurrence interval and a graph 1102 of an operation history of each control device. Here, the vertical axis of the graph 1100 indicates the number of times of occurrence of communication errors, and the horizontal axes of the graphs 1100 and 1102 indicate the elapse of time. Further, in the example of the graph 1100, it can be understood that noise is mixed into the communication path 96 at a frequency of the communication error occurrence interval 1101. In addition, the control device 94 or control device 95 that was operating at each time are shown.

Through the procedure described above, the CRC calculation unit 20 can finally estimate the cause of occurrence of an abnormality. As for the content, for example, it is estimated that the control device 95 (equipment) shown below is most likely to be the cause of an abnormality in the device.

Equipment disposed in the vicinity of the communication path 96 determined based on the totalization result 1000

Equipment with a drive frequency that approximates to the communication error occurrence interval 1101 determined based on the graph 1100

Equipment whose operating time matches the time when a communication error occurs In Example 2 described above, even when an abnormality occurs in a device due to an unknown breakdown or noise in industrial equipment into which a control system is introduced, the cause of occurrence of the abnormality can be estimated. This completes the description of Example 2.

Example 3

Next, in Example 3, the output of an estimated cause of occurrence will be described. FIG. 12 is a diagram showing a communication error monitoring screen 1200 that displays an an abnormality in the estimated cause of occurrence of distributed control system 1 in this example. It is desirable that the communication error monitoring screen 1200 be displayed on a display device connected to the central processing unit 13 in FIG. 1. In addition, the screen may be displayed by a terminal device 902, which will be described later.

Furthermore, in FIG. 12, the communication error monitoring screen 1200 includes a network display screen 1201 that displays a configuration of the distributed control system 1 introduced into industrial equipment, and an error information screen 1202 that displays communication error information.

The error information screen 1202 includes an error history screen 1203, an error message screen 1204, and an error cause list screen 1205. Here, the error history screen 1203 displays the type of communication error, the time of occurrence of the communication error, and the like. The error message screen 1204 displays an error message when a communication error occurs in the distributed control system 1. The error cause list screen 1205 displays equipment as a candidate for the cause of an abnormality in the distributed control system 1. Here, as in the communication error monitoring screen 1200, the state of a communication error that has occurred in the distributed control system 1 and the location of an estimated abnormality cause, which have been described up to Example 2, are visually displayed, which can contribute to early return to normalcy of industrial equipment. This completes the description of Example 3.

Next, an application example of each example will be described. FIG. 13 is a diagram showing an application example of each example. According to this application example, a plurality of distributed control systems 1 can be managed by the central processing unit 13. For this reason, a server device 130 including the central processing unit 13 is provided in FIG. 13. The server device 130 is connected to a network 901 and a terminal device 902. The terminal device 902 inputs various instructions to the server device 130 and outputs processing results of the server device 130. This output includes a communication error monitoring screen 1200. Further, the server device 130 can be realized by a so-called computer and can be referred to as a cloud system.

Further, the server device 130 is connected to a plurality of distributed control systems 1 via the network 901 such as the Internet. As a result, the server device 130 can receive the cause of occurrence of an abnormality from each distributed control system 1. At least a part of the estimation of the cause of occurrence of an abnormality in Example 1 may be executed by the server device 130. Furthermore, in the configuration of Example 1, the central processing unit 13 may execute at least a part of the estimation of the cause of occurrence of an abnormality.

This completes the description of the embodiment and the examples of the invention, but the invention is not limited thereto. For example, the distributed system also includes systems other than the distributed control system 1, such as a communication system. The invention also includes the following aspects. The following distributed control system can be read as a distributed system including a communication system.

(1) A distributed control system including at least one communication master station and at least one communication slave station, in which the communication master station and the communication slave station, or the communication slave station and another communication slave station are connected to each other via a communication path, the communication master station or the communication slave station continuously transmits either the data code or the control code, the communication master station or the communication slave station performs error detection every time the data code or the control code is received, and issues a communication error when an error occurs, the distributed control system defines characteristics of a signal abnormality occurring in the communication path based on the communication error, the distributed control system further records the time when the communication error occurs, the type of the communication error, and the location where the communication error is detected, and the distributed control system estimates an electrical cause of occurrence of a communication error by comparing operation information such as a control procedure of industrial equipment in which the distributed control system is installed and the location of a device in the equipment with a plurality of pieces of the communication error information.

(2) The distributed control system according to (1), in which both the data code and the control code are binary arrays defined in advance in the distributed control system, and the communication master station or the communication slave station detects a communication error due to a code error in a case where the data code or the control code is the binary arrays that have not been defined when the communication master station or the communication slave station receives the data code or the control code.

(3) The distributed control system according to (1), in which the distributed control system includes a packet in which at least one data code is combined, and the communication master station and the communication slave station perform a redundancy cyclic check when receiving the packet, and detects a communication error due to a redundancy cyclic check error when the redundancy cyclic check is incorrect.

(4) The distributed control system according to (1), in which the distributed control system includes a packet in which at least one data code is combined, and the communication master station and the communication slave station receive the data code, and detect a communication error due to a time-out at the time of receiving the packet when a certain number of data codes cannot be received after a certain period of time.

(5) The distributed control system according to (1), in which when the communication master station and the communication slave station do not receive the control codes in accordance with the order of the control codes which is defined in advance while continuously receiving the control codes, the communication master station and the communication slave station detect a communication error due to the control code reception error.

(6) The distributed control system according to (1), in which the communication master station or the communication slave station detects a disconnection communication error when the value of a communication signal does not change for a certain period of time.

(7) The distributed control system according to any one of (1) to (6), in which the communication path connected to the communication port where the communication error has been detected the most is determined to be the communication path located in the vicinity of the cause of an abnormality based on the communication port where the communication error has been issued and the number of times of occurrence of the communication error.

(8) The distributed control system according to any one of (1) to (6), in which an occurrence interval of the communication errors is determined based on the time of occurrence from when at least one communication error occurs until at least one next communication error occurs.

(9) The distributed control system according to (7) or (8), in which the industrial equipment includes control device including at least one actuator or at least one sensor, and the control device may be connected to the communication slave station, and the distributed control system estimates the cause of occurrence of the communication error, checks whether at least one control value collected by the distributed control system during control of the industrial equipment has been updated when there is no communication error, determines that a breakdown occurs in the communication master station when all of the control values are not updated, and determines that a breakdown occurs in the corresponding control device or the communication slave station when at least one of the control values is not updated.

(10) The distributed control system according to (9), in which the degree of severity of a failure occurring in the industrial equipment is determined based on a distribution of types of the communication errors and the number of times of occurrence of the communication errors in at least one of the communication errors.

(11) The distributed control system according to (9), in which when the communication error occurs, device information of the industrial equipment in which the distributed control system is installed is compared, the control devices disposed in the vicinity of the communication path where the communication error has occurred are sequentially set as candidates for the cause of occurrence of the communication error, and the corresponding control devices are listed as the cause of occurrence of the communication error in the order of the candidates.

(12) The distributed control system according to (9), in which when the communication error occurs, device information of the industrial equipment in which the distributed control system is installed is compared, an occurrence interval of the communication errors is compared with a drive frequency of the control device, control devices having a drive frequency approximating to the occurrence interval are sequentially set as candidates for the cause of occurrence of the communication error, and the corresponding control devices are listed as the cause of occurrence of the communication error in the order of the candidates.

(13) The distributed control system according to (9), in which when the communication error occurs, device information of the industrial equipment in which the distributed control system is installed is compared, the control devices operating during the time of occurrence of the communication error are sequentially set as candidates for the cause of occurrence of the communication error based on the time of occurrence of the communication error and a control plan or an operation history of the industrial equipment, and the corresponding control devices are listed as the cause of occurrence of the communication error in the order of the candidates.

(14) The distributed control system according to any one of (10) to (13), in which the control devices are listed as the cause of occurrence of the communication error in descending order of the number of conditions that allow the device to be candidates for the cause of occurrence of the communication error.

(15) The distributed control system according to (1), in which the distributed control system uses a packet in which at least one of the data codes is combined, the communication port includes a serial communication unit, and the serial communication unit continuously transmits the control codes when the packet is not transferred, and sequentially transmits the data codes included in the packet as soon as the preparation for transmission of the packet is completed and the transmission of the control code being transmitted is completed, and the communication master station or the communication slave station restarts to transmit the control code as soon as the transmission of the packet is completed.

(16) The distributed control system according to (1), in which the communication master station is connected to a central processing unit, the communication master station or the communication slave station includes a communication control unit, the communication control unit is connected to the serial communication unit, the communication error is detected by the serial communication unit, the communication slave station stores the time when the communication error is detected and information on the communication error in the packet, the packet is transferred to the communication master station via the communication path, the communication master station notifies the central processing unit of the time when the communication error is detected and the information on the communication error, and the communication master station notifies the central processing unit of the information on the communication error which is transferred from the communication slave station and the time of occurrence thereof.

(17) The distributed control system according to (14), in which the distributed control system includes an output device that visually displays information including a configuration of the distributed control system, information on the communication error, and candidates for the cause of occurrence of the communication error.

(18) A method of estimating a cause of occurrence of an abnormality using the distributed control system according to any one of (1) to (17).

REFERENCE SIGNS LIST

1: distributed control system
10: communication master station
100: master station communication control unit
101: serial communication unit
102: communication port
11: communication path
12: communication slave station
120: slave station communication control unit
20: CRC calculation unit
21: encoding unit
22: serialization unit
23: decoding unit
24: deserialization unit
25: sampling unit
3: packet
30: CRC part
31: data part
32: time part
33: command part
34: address part
40: clock
41: serial data
42: control code
43: data code
50: noise
51: communication port
52: communication error information
90: industrial equipment
91: communication slave station
92: communication slave station
93: input/output substrate
94: control device
95: control device
96: communication path
1000: totalization result
1100: graph
1101: communication error occurrence interval 1102: graph
1200: communication error monitoring screen
1201: network display screen
1202: error information screen
1203: error history screen
1204: error message screen
1205: error cause list screen

The invention claimed is:

1. A distributed system comprising:
a plurality of distributed devices that are capable of communication via a communication path, wherein
each of the distributed devices includes
a communication port that receives communication signals from the other distributed devices,
a storage unit that stores device information indicating characteristics of the distributed system, and
an inspection unit that detects a communication error in accordance with the communication signal, and estimates a cause of occurrence of the communication error by comparing the device information with communication error information indicating the communication error and including the time of occurrence of the communication error, a type of the communication error, and a location where the communication error is detected;
wherein
the distributed system is a distributed control system further including a control device, and the communication signal is a control code including a control value for controlling the control device,
the plurality of distributed devices are a communication master station and a plurality of communication slave stations in the communication, and
the inspection unit checks whether the plurality of control values have been updated, determines that a breakdown has occurred in the communication master station when the plurality of control values have not been updated, and determines that a breakdown has occurred in the control device or the communication slave station when some of the plurality of control values have not been updated.

2. The distributed system according to claim 1, wherein the communication ports of the other distributed devices continuously output the communication signals to the distributed device, and the communication port continuously outputs the communication signals to the other distributed devices.

3. The distributed system according to claim 2, wherein the inspection unit of the distributed device performs error detection upon receiving the received communication signal, and detects the communication error in accordance with a result of the error detection.

4. The distributed system according to claim 3, wherein the inspection unit of the distributed device estimates a code error as the cause of occurrence when the received communication signal is an undefined binary array.

5. The distributed system according to claim 3, wherein the communication signal is a packet including one or more data codes, and
the inspection unit of the distributed device performs a redundancy cyclic check on the packet, and when the redundancy cyclic check is incorrect, the inspection unit estimates a redundancy cyclic check error as the cause of occurrence.

6. The distributed system according to claim 3, wherein the communication signal is a data code, and the inspection unit of the distributed device estimates a time-out in receiving the communication signal as the cause of occurrence when a certain number of the data codes are not able to be received within a certain period of time.

7. The distributed system according to claim 3, wherein the communication signal is a control code, and
when the inspection unit of the distributed device does not receive the control codes in a predefined order of the control codes while the communication port is continuously outputting the communication signals, the inspection unit estimates a reception error of the control code as the cause of occurrence.

8. The distributed system according to claim 3, wherein the inspection unit estimates disconnection of the communication as the cause of occurrence when a value of the communication signal does not change for a certain period of time.

9. The distributed system according to claim 1, wherein the distributed control system is installed in industrial equipment including an actuator and a sensor.

10. The distributed system according to claim 9, wherein the inspection unit determines a degree of severity of a failure occurring in the industrial equipment based on a distribution of the types of communication errors and the number of times of occurrence of communication errors.

11. A distributed device that is capable of communicating with other distributed devices via a communication path and constitutes a distributed system, the distributed device comprising:
a communication port that receives communication signals from the other distributed device;
a storage unit that stores device information indicating characteristics of the distributed system; and
an inspection unit that detects a communication error in accordance with the communication signal, and estimates a cause of occurrence of the communication error by comparing the device information with communication error information indicating the communication error and including the time of occurrence of the communication error, a type of the communication error, and a location where the communication error is detected;
wherein
the distributed system is a distributed control system further including a control device, and the communication signal is a control code including a control value for controlling the control device,
the plurality of distributed devices are a communication master station and a plurality of communication slave stations in the communication, and
the inspection unit checks whether the plurality of control values have been updated, determines that a breakdown has occurred in the communication master station when the plurality of control values have not been updated, and determines that a breakdown has occurred in the control device or the communication slave station when some of the plurality of control values have not been updated.

12. The distributed device according to claim 11, wherein the communication ports of the other distributed devices continuously output the communication signals to the distributed device, and the communication port continuously outputs the communication signals to the other distributed devices.

13. The distributed device according to claim 12, wherein the inspection unit performs error detection upon receiving the received communication signal, and detects the communication error in accordance with a result of the error detection.

14. The distributed device according to claim 13, wherein the inspection unit estimates a code error as the cause of occurrence when the received communication signal is an undefined binary array.

15. The distributed device according to claim 13, wherein the communication signal is a packet including one or more data codes, and the inspection unit performs a redundancy cyclic check on the packet, and estimates a redundancy cyclic check error as the cause of occurrence when the redundancy cyclic check is incorrect.

16. The distributed device according to claim 13, wherein the communication signal is a data code, and the inspection unit estimates a time-out in receiving the communication signal as the cause of occurrence when a certain number of the data codes are not able to be received within a certain period of time.

17. The distributed device according to claim 13, wherein the communication signal is a control code, and when the inspection unit does not receive the control codes in a predefined order of the control codes while the communication port is continuously outputting the communication signals, the inspection unit estimates a reception error of the control code as the cause of occurrence.

18. The distributed device according to claim 13, wherein the inspection unit estimates disconnection of the communication as the cause of occurrence when a value of the communication signal does not change for a certain period of time.

\* \* \* \* \*